US012411433B2

(12) United States Patent
Yokoi et al.

(10) Patent No.: US 12,411,433 B2
(45) Date of Patent: Sep. 9, 2025

(54) SCANNING OPTICAL DEVICE HAVING POSITIONING PART ON REINFORCED WALL FOR POSITIONING OF THE DEVICE RELATIVE TO MAIN BODY OF IMAGE-FORMING APPARATUS

(71) Applicant: BROTHER KOGYO KABUSHIKI KAISHA, Nagoya (JP)

(72) Inventors: Junichi Yokoi, Nagoya (JP); Koji Abe, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/494,439

(22) Filed: Oct. 25, 2023

(65) Prior Publication Data

US 2024/0168403 A1 May 23, 2024

(30) Foreign Application Priority Data

Nov. 18, 2022 (JP) ................................ 2022-184677

(51) Int. Cl.
*G03G 15/04* (2006.01)

(52) U.S. Cl.
CPC .............................. *G03G 15/04036* (2013.01)

(58) Field of Classification Search
USPC ........................................................ 399/216
See application file for complete search history.

(56) References Cited

U.S. PATENT DOCUMENTS 5,956,072 A 9/1999 Omura

FOREIGN PATENT DOCUMENTS

| | | | | |
|---|---|---|---|---|
| EP | 3051326 B1 * | 10/2018 | ............ | G02B 26/10 |
| JP | H10-153745 A | 6/1998 | | |
| JP | H10-233899 A | 9/1998 | | |
| JP | 2003-266790 A | 9/2003 | | |
| JP | 2006-123478 A | 5/2006 | | |

* cited by examiner

*Primary Examiner* — Quana Grainger
(74) *Attorney, Agent, or Firm* — Baker Botts L.L.P.

(57) ABSTRACT

A scanning optical device includes a light source, a deflector, a scanning optical system, and a frame. The deflector includes a polygon mirror rotatable about an axis extending in a first direction to deflect light beam from the light source. The scanning optical system is configured to form an image on an image plane using the light beam from the polygon mirror. The light source, the deflector, and the scanning optical system are fixed to the frame. The frame includes: a base wall on which the deflector is mounted; a first wall extending from the base wall toward one side in the first direction; a crossing wall extending in a direction crossing the first direction from the first wall; a second wall extending toward another side in the first direction from the crossing wall; and a positioning part provided on the crossing wall.

15 Claims, 10 Drawing Sheets

SCANNING OPTICAL DEVICE HAVING POSITIONING PART ON REINFORCED WALL FOR POSITIONING OF THE DEVICE RELATIVE TO MAIN BODY OF IMAGE-FORMING APPARATUS

REFERENCE TO RELATED APPLICATIONS

This application claims priority from Japanese Patent Application No. 2022-184677 filed on Nov. 18, 2022. The entire content of the priority application is incorporated herein by reference.

BACKGROUND ART

One conventional scanning optical device for use in an image-forming apparatus includes a box-like frame having a bottom wall that supports a polygon mirror and the like, and side walls that protrude upward from peripheral edges of the bottom wall. In this technology, a protrusion is provided on an edge of one side wall to protrude in a direction away from the bottom wall.

DESCRIPTION

Conceivably, the protrusion of the side wall in the above conventional technology may be used for positioning the scanning optical device when the device is attached to a main body of the image-forming apparatus. However, if this side wall bends or otherwise deforms during the positioning of the scanning optical device, the device may not be positioned accurately relative to the main body.

In view of the foregoing, it is an object of the present disclosure to provide a scanning optical device capable of being positioned accurately relative to a main body of an image-forming apparatus.

In order to attain the above and other objects, according to one aspect, the present disclosure provides a scanning optical device mounted on a main body of an image-forming apparatus. The scanning optical device includes a light source, a deflector, a scanning optical system, and a frame. The light source is configured to emit light beam. The deflector includes a polygon mirror configured to deflect the light beam from the light source. The polygon mirror is rotatable about an axis extending in a first direction. The scanning optical system is configured to form an image on an image plane using the light beam from the polygon mirror. The light source, the deflector and the scanning optical system are fixed to the frame. The frame includes: a base wall on which the deflector is mounted; a first wall extending from the base wall toward one side in the first direction; a crossing wall extending in a direction crossing the first direction from the first wall; a second wall extending toward another side in the first direction from the crossing wall; and a positioning part provided on the crossing wall for positioning of the scanning optical device relative to the main body.

By providing the positioning part on the crossing wall, which is strengthened by the first and second walls, this configuration can position the scanning optical device accurately relative to the main body.

FIG. 8 is a plan view illustrating a positional relationship among the positioning part, the second positioning part, a polygon mirror, and the like.

Figure 1:
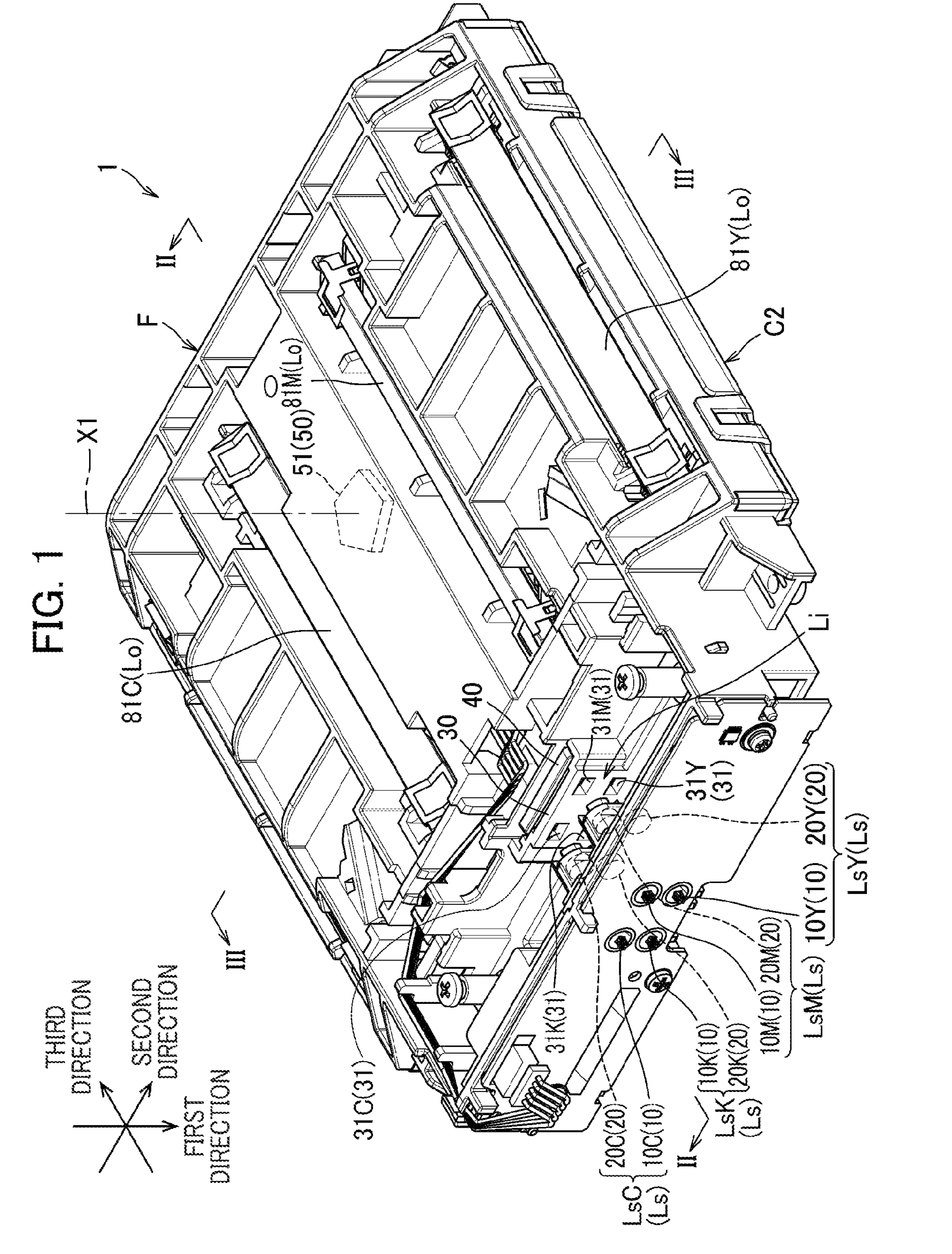
FIG. 1 is a perspective view of a scanning optical device according to one embodiment of the disclosure.

FIG. 1 shows a scanning optical device 1 according to one embodiment of the disclosure. As illustrated in FIG. 1, the scanning optical device 1 includes a frame F, an incident optical system Li, a deflector 50, and scanning optical systems Lo. In the present embodiment, the scanning optical device 1 is employed in an electrophotographic image-forming apparatus. The image-forming apparatus includes four photosensitive drums 200 (see FIG. 3).

In the following description, a direction parallel to a rotational axis X1 of a polygon mirror 51 described later will be called a "first direction." Further, a direction in which the polygon mirror 51 is aligned with a first scanning lens 60YM (see FIG. 3) and that is orthogonal to the first direction will be called a "second direction." Further, a direction orthogonal to both the first and second directions will be called a "third direction." The third direction corresponds to a main scanning direction, and the first direction corresponds to a sub scanning direction of the incident optical system Li.

Further, arrows in the drawings for these directions each point to one side of the respective direction. Specifically, in the following description, "one end" or "one end portion" implies a component at the one side in the corresponding direction (a leading side of the arrow), and "another end" or "another end portion" implies a component at another side in the corresponding direction (a trailing side of the arrow).

The incident optical system Li includes four light sources Ls, an aperture plate 30, and a condenser lens 40.

The light sources Ls are devices for emitting light beams. The light source Ls are fixed to the frame F. Each light source Ls includes a semiconductor laser 10, and a coupling lens 20.

The semiconductor laser 10 is a device configured to emit laser light. Four of the semiconductor lasers 10 are provided for the corresponding four photosensitive drums 200 (see FIG. 3) which are configured to be scanned and exposed by the scanning optical device 1. Toner images in different colors are formed on the respective photosensitive drums 200.

In the present embodiment, among the four different colors of toner, the first color will be yellow (Y), the second color will be magenta (M), the third color will be cyan (C), and the fourth color will be black (K). In the following description, parts related to the first color may be distinguished by adding "first" to the beginning of the part name and "Y" to the end of the reference numeral for the corresponding part. Similarly, parts related to the second, third, and fourth colors may be distinguished by adding "second,"

"third," and "fourth," respectively, to the beginning of the part name and "M", "C", and "K", respectively, to the end of the reference numeral.

The semiconductor lasers 10 include a first semiconductor laser 10Y corresponding to yellow, a second semiconductor laser 10M corresponding to magenta, a third semiconductor laser 10C corresponding to cyan, and a fourth semiconductor laser 10K corresponding to black. The first semiconductor laser 10Y is spaced apart from the second semiconductor laser 10M in the first direction. The first semiconductor laser 10Y is positioned on the one side of the second semiconductor laser 10M in the first direction.

The third semiconductor laser 10C is spaced apart from the second semiconductor laser 10M in the second direction. The third semiconductor laser 10C is positioned on the other side of the second semiconductor laser 10M in the second direction. The fourth semiconductor laser 10K is spaced apart from the third semiconductor laser 10C in the first direction and is spaced apart from the first semiconductor laser 10Y in the second direction.

The coupling lenses 20 are configured to convert laser light emitted from the respective semiconductor lasers 10 into light beams. The coupling lenses 20Y, 20M, 20C, and 20K corresponding to the four colors are positioned to oppose the corresponding semiconductor lasers 10Y, 10M, 10C, and 10K.

The aperture plate 30 has aperture diaphragms 31 through which the light beams exiting the coupling lenses 20 pass. In this embodiment, the aperture plate 30 is formed integrally with the frame F. The aperture plate 30 is located between the coupling lenses 20 and the condenser lens 40. Four aperture diaphragms 31Y, 31M, 31C, and 31K are provided to correspond to the four light sources LsY, LsM, LsC, and LsK.

The condenser lens 40 focuses the light beams emitted from the respective coupling lenses 20 onto mirror surfaces of the polygon mirror 51 in the sub scanning direction. The condenser lens 40 is positioned opposite the coupling lenses 20 with respect to the aperture plate 30.

Figure 2:
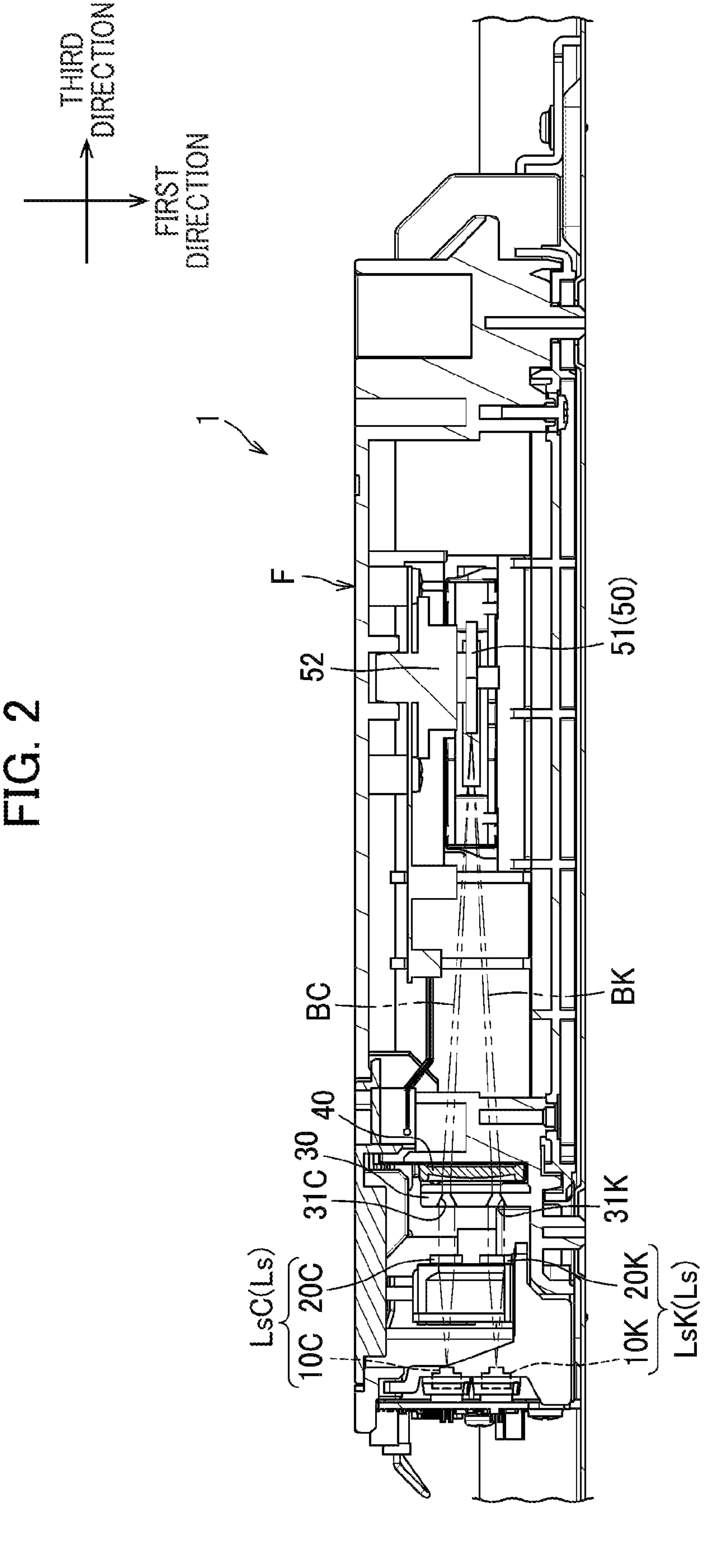
FIG. 2 is a cross-sectional view taken along a plane II-II in FIG. 1.

As illustrated in FIG. 2, the deflector 50 is a device configured to deflect the light beams from the light sources Ls in the main scanning direction (third direction). The deflector 50 includes the polygon mirror 51, and a motor 52. The polygon mirror 51 deflects the light beams in the main scanning direction by rotating. The polygon mirror 51 has five mirror surfaces equidistant from the rotational axis X1 (see also FIG. 1). The motor 52 is configured to rotate the polygon mirror 51. The motor 52 is fixed to the frame F.

Figure 3:
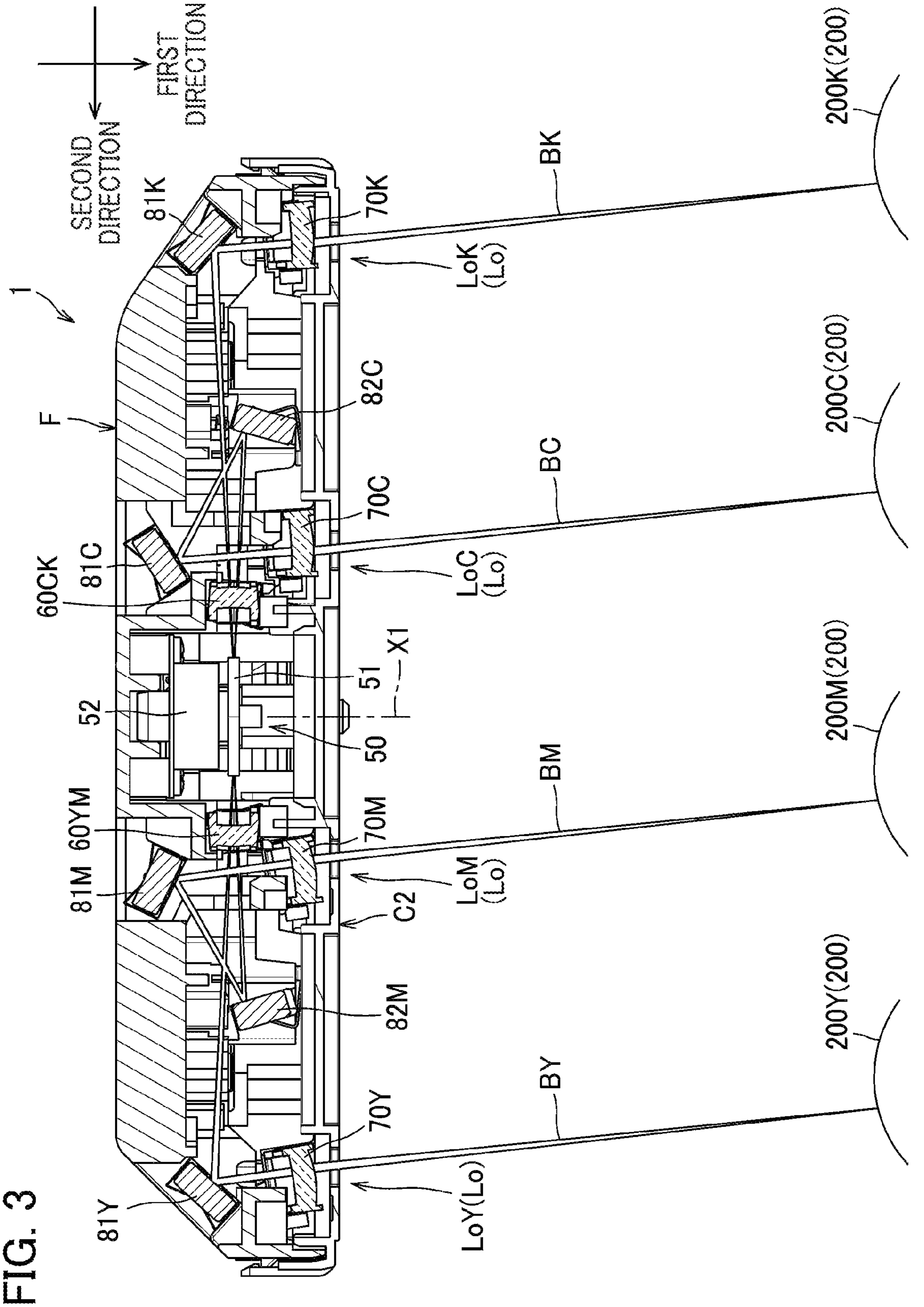
FIG. 3 is a cross-sectional view taken along a plane III-III in FIG. 1.

As illustrated in FIG. 3, the scanning optical systems Lo function to form images on surfaces of the corresponding photosensitive drums 200, as image planes, using the light beams deflected by the deflector 50. Components of each scanning optical system Lo are fixed to the frame F. The scanning optical systems Lo include a first scanning optical system LoY corresponding to yellow, a second scanning optical system LoM corresponding to magenta, a third scanning optical system LoC corresponding to cyan, and a fourth scanning optical system LoK corresponding to black.

The first scanning optical system LoY and second scanning optical system LoM are disposed on the one side of the polygon mirror 51 in the second direction. The third scanning optical system LoC and fourth scanning optical system LoK are disposed on the other side of the polygon mirror 51 in the second direction. Light beams deflected in the main scanning direction by the polygon mirror 51 are incident on the corresponding scanning optical systems LoY, LoM, LoC, and LoK.

The first scanning optical system LoY includes the first scanning lens 60YM, a scanning lens 70Y, and a reflecting mirror 81Y.

The first scanning lens 60YM refracts light beams BY and BM deflected by the deflector 50 in the main scanning direction to form images on the corresponding photosensitive drums 200Y and 200M. The first scanning lens 60YM has fθ characteristics that make the light beams BY and BM scanned at an equal angular velocity by the deflector 50 move at an equal velocity over the photosensitive drums 200Y and 200M.

The reflecting mirror 81Y reflects the light beam BY exiting the first scanning lens 60YM toward the first photosensitive drum 200Y.

The scanning lens 70Y refracts the light beam BY reflected by the reflecting mirror 81Y in the sub scanning direction to form an image on the first photosensitive drum 200Y. In the scanning optical system Lo, the sub scanning direction corresponds to a direction orthogonal to both the main scanning direction and the direction in which the light beam travels. The scanning lens 70Y is positioned on the one side of the polygon mirror 51 in the first direction.

The second scanning optical system LoM includes the first scanning lens 60YM, a scanning lens 70M, a reflecting mirror 81M, and a mirror 82M.

The first scanning lens 60YM of the second scanning optical system LoM is shared with the first scanning optical system LoY. The mirror 82M reflects the light beam BM exiting the first scanning lens 60YM onto the reflecting mirror 81M. The scanning lens 70M and the reflecting mirror 81M have the same functions as the scanning lens 70Y and reflecting mirror 81Y in the first scanning optical system LoY. In other words, the reflecting mirror 81M reflects the light beam BM reflected off the mirror 82M toward the second photosensitive drum 200M, and the scanning lens 70M refracts the light beam BM reflected by the reflecting mirror 81M in the sub scanning direction to form an image on the second photosensitive drum 200M.

The third scanning optical system LoC has an approximate symmetrical configuration to the second scanning optical system LoM about the rotational axis X1 of the polygon mirror 51. Specifically, the third scanning optical system LoC includes a second scanning lens 60CK, a scanning lens 70C, a reflecting mirror 81C, and a mirror 82C, which possess the same functions as the components in the second scanning optical system LoM.

The second scanning lens 60CK refracts light beams BC and BK deflected by the deflector 50 in the main scanning direction to form images on the corresponding photosensitive drums 200C and 200K. The second scanning lens 60CK has fθ characteristics that make the light beams BC and BK scanned at an equal angular velocity by the deflector 50 move at an equal velocity over the photosensitive drums 200C and 200K.

The mirror 82C reflects the light beam BC exiting the second scanning lens 60CK onto the reflecting mirror 81C, and the reflecting mirror 81C reflects the light beam BC reflected by the mirror 82C toward the third photosensitive drum 200C. The scanning lens 70C refracts the light beam BC reflected by the reflecting mirror 81C in the sub scanning direction to form an image on the third photosensitive drum 200C.

The fourth scanning optical system LoK has an approximately symmetrical configuration to the first scanning optical system LoY about the rotational axis X1 of the polygon mirror 51. Specifically, the fourth scanning optical system LoK includes the second scanning lens 60CK, a scanning lens 70K, and a reflecting mirror 81K, which possess the same functions as the components in the first scanning optical system LoY.

The reflecting mirror 81K reflects the light beam BK exiting the second scanning lens 60CK toward the fourth photosensitive drum 200K, and the scanning lens 70K refracts the light beam BK reflected by the reflecting mirror 81K in the sub scanning direction to form an image on the fourth photosensitive drum 200K.

As illustrated in FIG. 2, laser light emitted from each of the semiconductor lasers 10Y, 10M, 10C, and 10K is converted to the light beams BY, BM, BC, and BK when passing through the corresponding coupling lenses 20Y, 20M, 20C, and 20K. The light beams BY, BM, BC, and BK emitted from each of the light sources LsY, LsM, LsC, and LsK pass first through the corresponding aperture diaphragms 31Y, 31M, 31C, and 31K of the aperture plate 30 and then through the condenser lens 40 before being incident on the polygon mirror 51. The condenser lens 40 is a shared lens through which each of the light beams BY, BM, BC, and BK pass. The incident surface of the condenser lens 40 is a cylindrical surface, while the emitting surface is flat.

As illustrated in FIG. 3, the polygon mirror 51 deflects the light beams BY, BM, BC, and BK toward the corresponding scanning optical systems LoY, LoM, LoC, and LoK. The light beam BY deflected toward the first scanning optical system LoY passes through the first scanning lens 60YM, is reflected by the reflecting mirror 81Y, and is emitted through the scanning lens 70Y toward the first photosensitive drum 200Y. The light beam BY exits the scanning lens 70Y at a predetermined angle to the first direction. The light beam BY forms an image on the surface of the first photosensitive drum 200Y while being scanned in the main scanning direction.

The light beam BM deflected toward the second scanning optical system LoM first passes through the first scanning lens 60YM, is reflected by the mirror 82M and reflecting mirror 81M, and is emitted through the scanning lens 70M toward the second photosensitive drum 200M. The light beam BM exits the scanning lens 70M at a predetermined angle to the first direction. The light beam BM forms an image on the surface of the second photosensitive drum 200M while being scanned in the main scanning direction. The light beams BC and BK are similarly emitted by the corresponding scanning optical systems LoC and LoK toward the corresponding photosensitive drums 200C and 200K and form images on the corresponding photosensitive drums 200C and 200K while being scanned in the main scanning direction.

Figure 4:
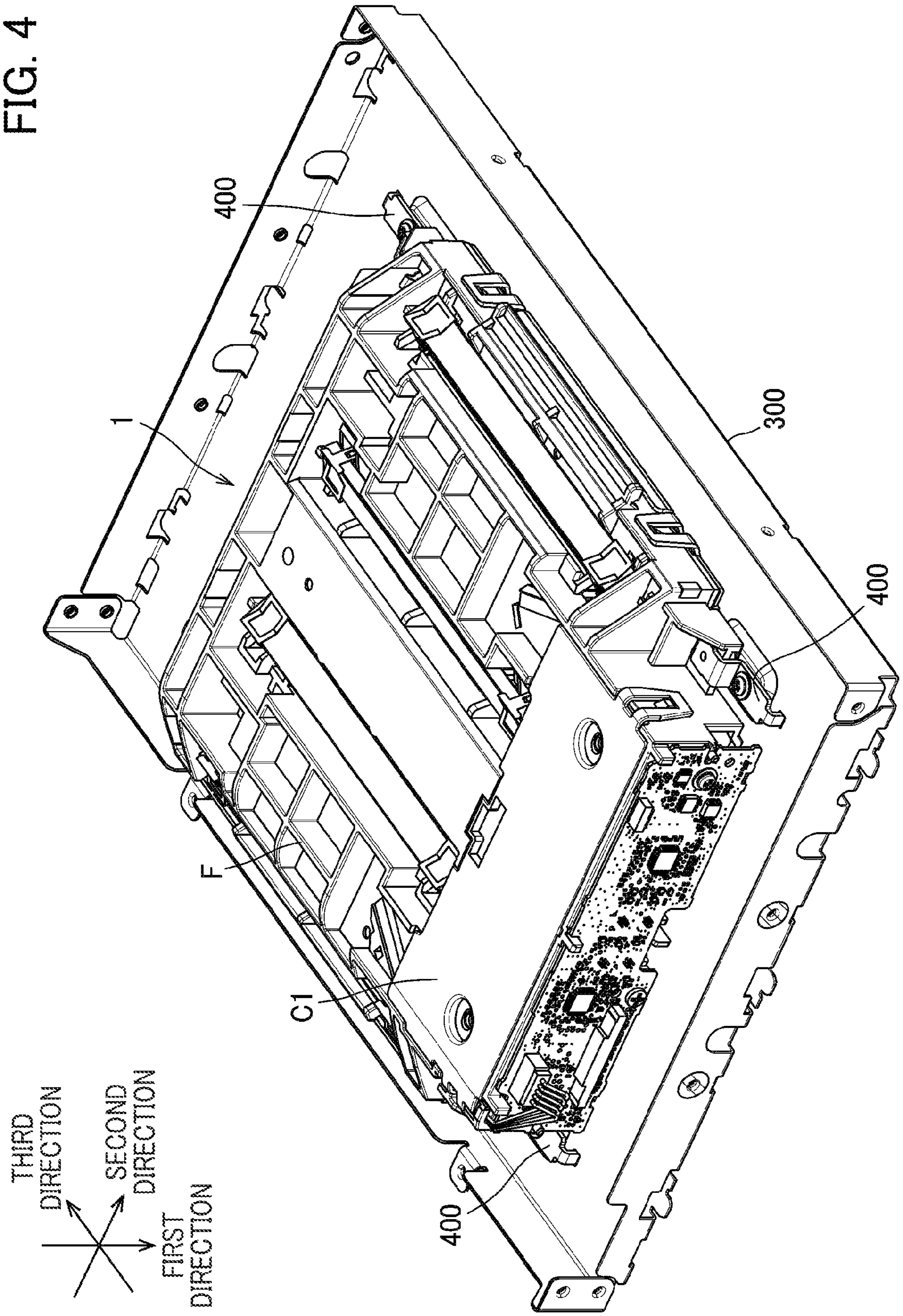
FIG. 4 is a perspective view of the scanning optical device attached to a support plate.

As illustrated in FIG. 4, the scanning optical device 1 is mounted on a support plate 300 that constitutes a main body of the image-forming apparatus. Specifically, the support plate 300 is a part of an inner frame constituting the main body of the image-forming apparatus. The support plate 300 is disposed between and connected to two side plates (not illustrated) that also constitute the main body.

Figure 5:
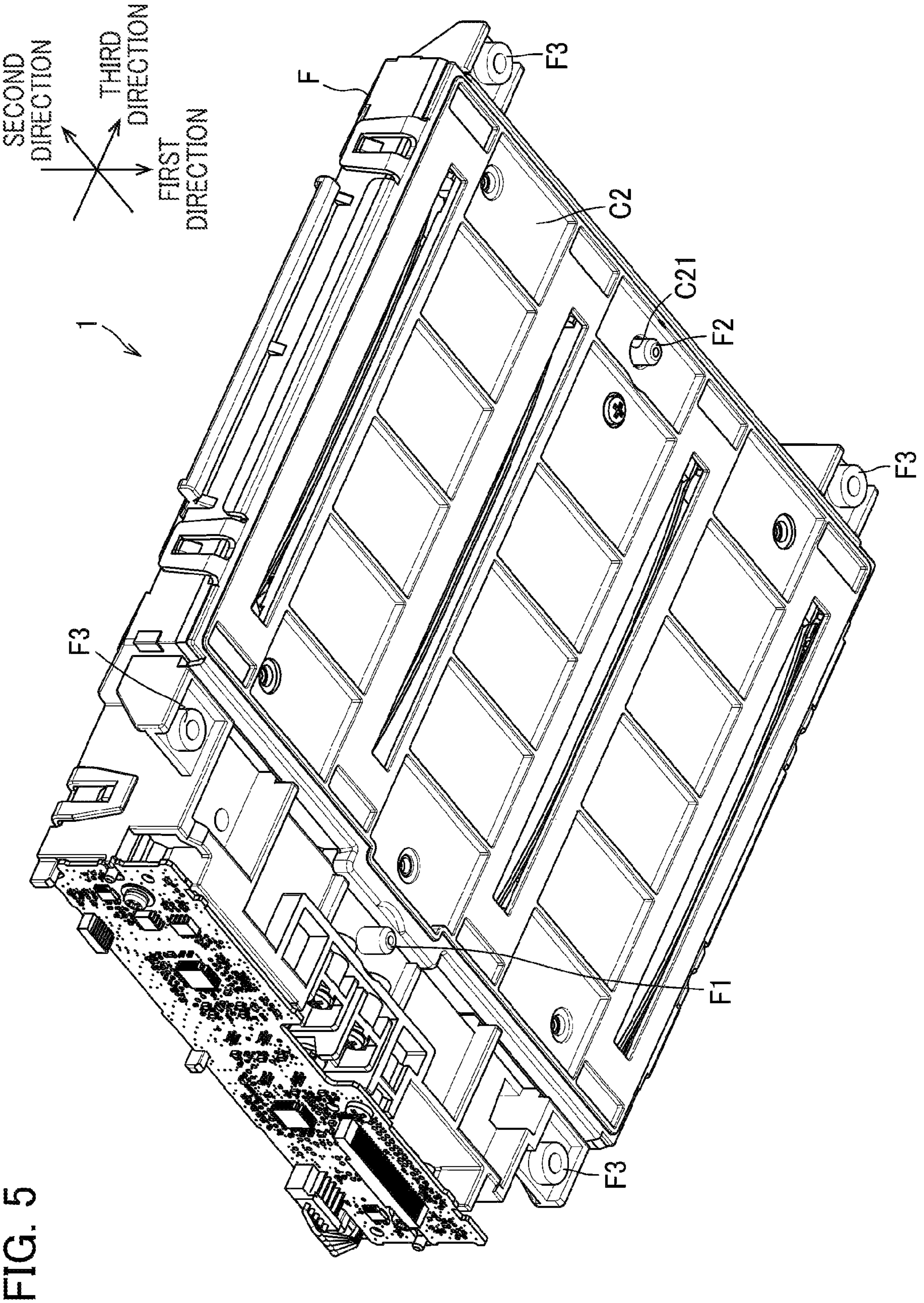
FIG. 5 is a perspective view of the scanning optical device as viewed from one side in a first direction.

As illustrated in FIGS. 4 and 5, the scanning optical device 1 further includes a first cover C1, and a second cover C2. The first cover C1 covers the incident optical system Li from the other side thereof in the first direction. The second cover C2 covers the deflector 50 and the scanning optical systems Lo from the one side thereof in the first direction.

As illustrated in FIG. 5, the frame F has a positioning part F1, a second positioning part F2, and four seating surfaces F3. The positioning part F1 and second positioning part F2 are bosses for positioning the scanning optical device 1 on the support plate 300. The second cover C2 has a hole C21 through which the second positioning part F2 passes.

The seating surfaces F3 contact the support plate 300 in the first direction. Each seating surface F3 is separated from the positioning part F1 and second positioning part F2 in the second direction. Specifically, two of the seating surfaces F3 are disposed one on either side of the positioning part F1 in the second direction, and remaining two of the seating surfaces F3 are disposed one on either side of the second positioning part F2 in the second direction.

Figure 6:
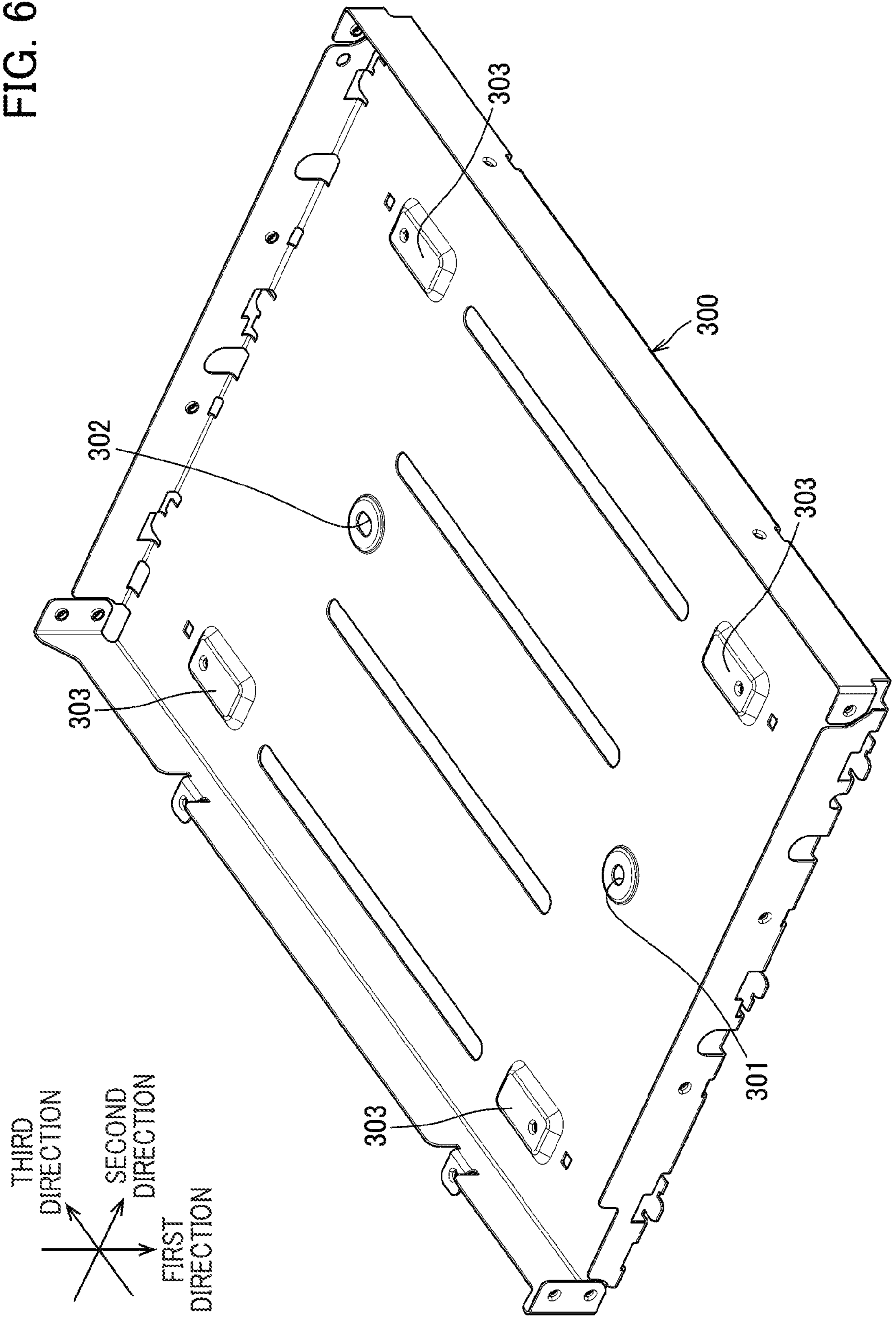
FIG. 6 is a perspective view of the support plate.

As illustrated in FIG. 6, the support plate 300 has a positioning hole 301, an elongated hole 302, and four support surfaces 303. The positioning part F1 of the frame F is inserted in the positioning hole 301. Inserting the positioning part F1 into the positioning hole 301 restricts movement of the frame F in the second and third directions.

The elongated hole 302 is elongated in the third direction. The second positioning part F2 of the frame F is inserted in the elongated hole 302. With the positioning part F1 inserted in the positioning hole 301 and the second positioning part F2 inserted in the elongated hole 302, the frame F is restricted from pivoting about the positioning part F1 and is able to thermally expand in the third direction with respect to the positioning part F1.

The support surfaces 303 contact the seating surfaces F3 of the frame F. This contact between the seating surfaces F3 and the corresponding support surfaces 303 serves to fix the position of the frame F in the first direction.

Figure 7A:
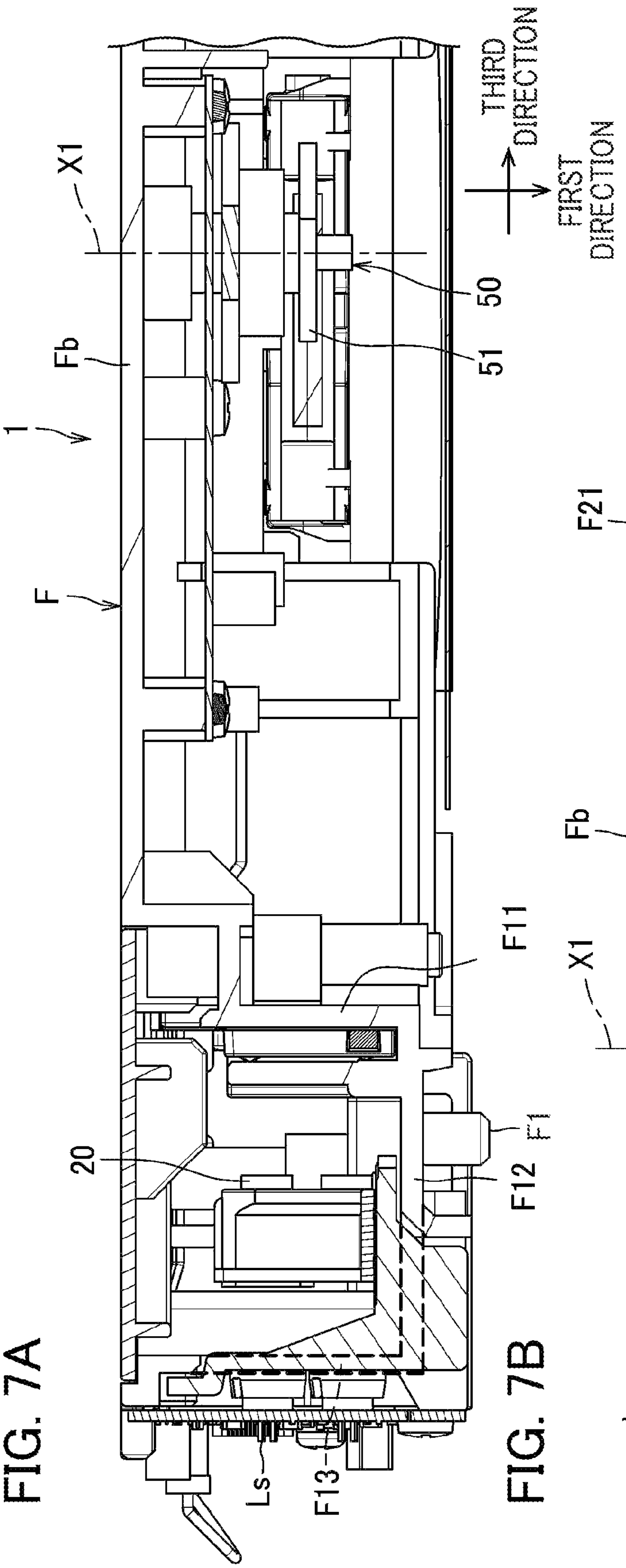
FIG. 7A is a cross-sectional view illustrating a structure of a frame around a positioning part.

As illustrated in FIG. 7A, the frame F further has a base wall Fb, a first wall F11, a crossing wall F12, and a second wall F13.

The deflector 50 is mounted on the base wall Fb. The first wall F11, crossing wall F12, and second wall F13 are all positioned on the other side of the base wall Fb in the third direction.

The first wall F11 extends toward the one side in the first direction from the base wall Fb. The crossing wall F12 extend, in a direction intersecting the first direction, and specifically toward the other side in the third direction from an end of the first wall F11 at the one side in the first direction. The second wall F13 extends toward the other side in the first direction from an end of the crossing wall F12 at the other side in the third direction.

The positioning part F1 is provided on the crossing wall F12. The positioning part F1 protrudes toward the one side in the first direction from the crossing wall F12. The coupling lenses 20 are positioned between the first wall F11 and the second wall F13 in the third direction, i.e., a direction orthogonal to the first direction.

Figure 7B:
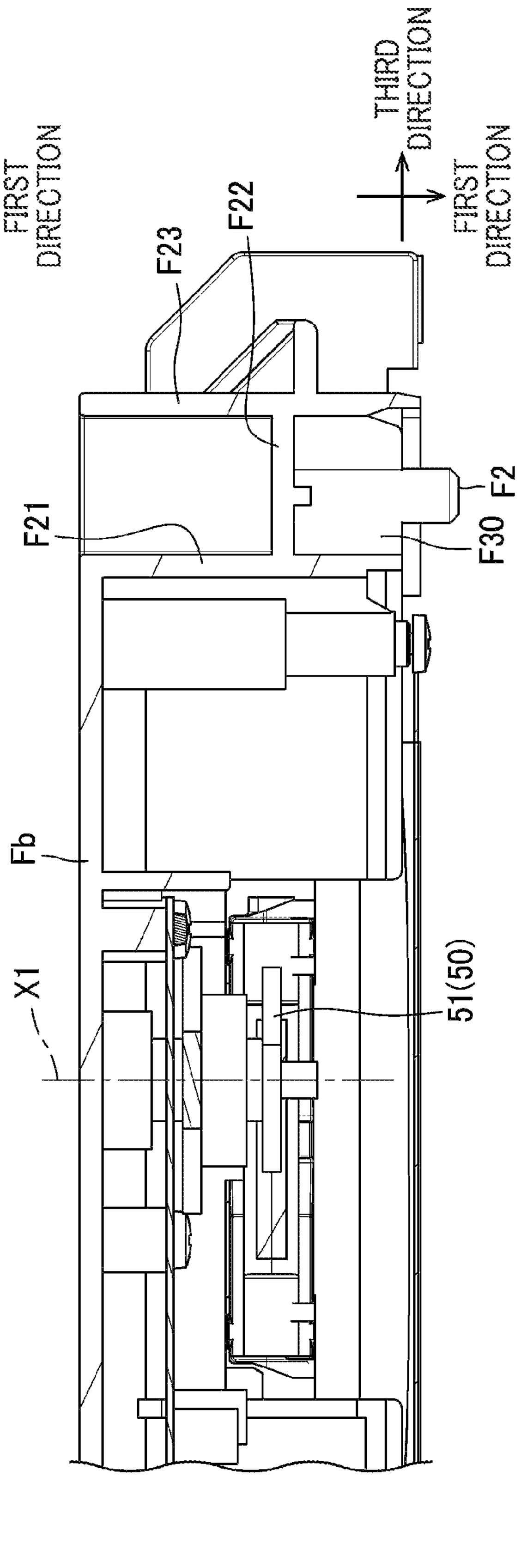
FIG. 7B is a cross-sectional view illustrating a structure of the frame around a second positioning part.

As illustrated in FIG. 7B, the frame F further has a first wall F21, a crossing wall F22, and a second wall F23. The first wall F21, crossing wall F22, and second wall F23 are all positioned on the one side of the base wall Fb in the third direction.

The first wall F21 extends toward the one side in the first direction from the base wall Fb. The crossing wall F22 extends in a direction intersecting the first direction, and specifically toward the one side in the third direction, from a midpoint of the first wall F21. The second wall F23 extends toward the other side in the first direction from an end of the crossing wall F22 at the one side in the third direction.

The second positioning part F2 is provided on the crossing wall F22. The first wall F21, second wall F23, and second positioning part F2 protrude toward the one side in the first direction from the crossing wall F22. The second positioning part F2 protrudes farther toward the one side in the first direction than the first wall F21 and second wall F23.

Figure 8:
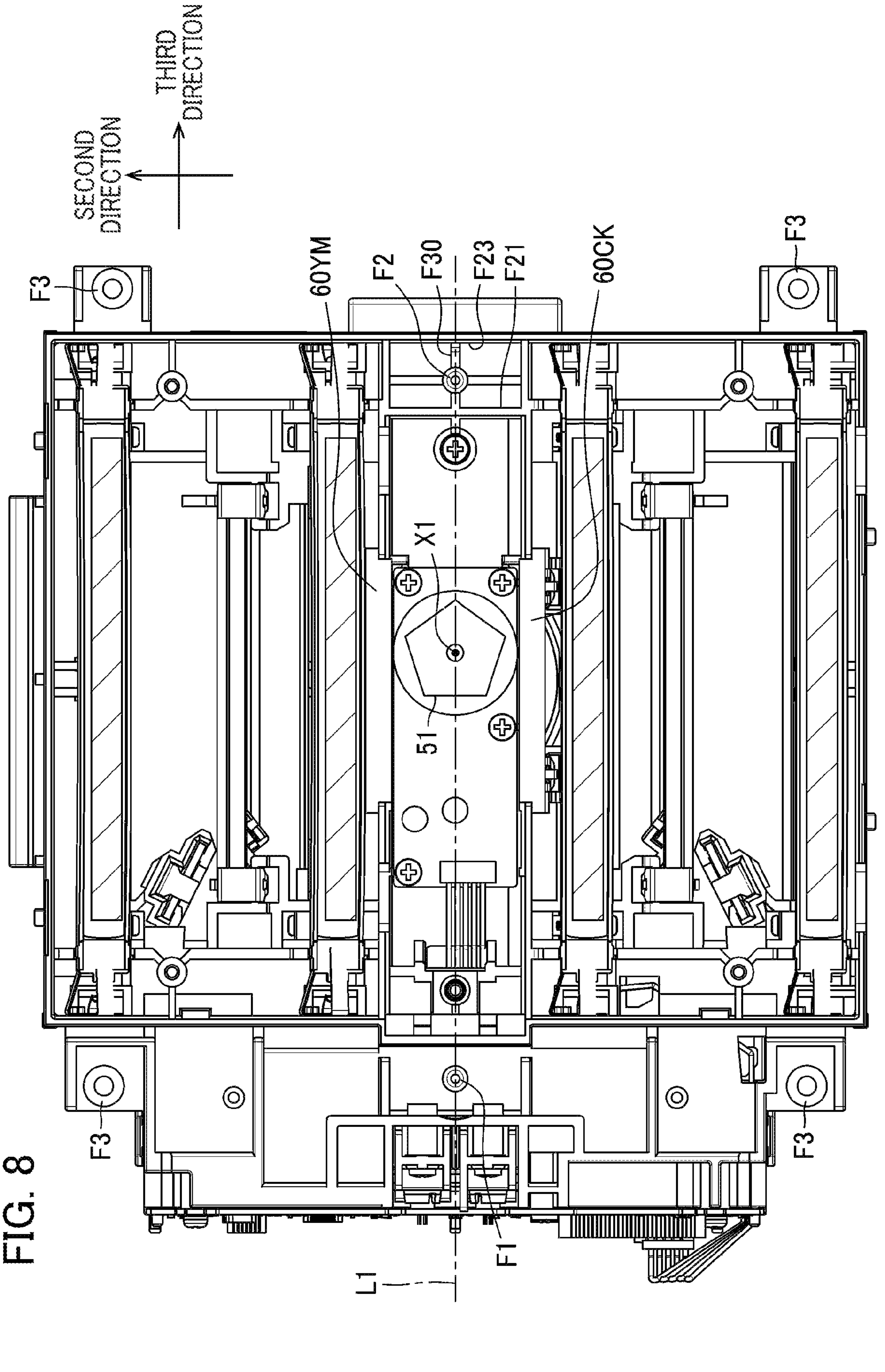

As illustrated in FIGS. 7B and 8, the frame F further has a rib F30 connected to the first wall F21 and the second wall F23. The rib F30 protrudes toward the one side in the first direction from the crossing wall F22 and extends in the third direction. The second positioning part F2 is integrally formed with the rib F30 and protrudes farther toward the one side in the first direction than the rib F30.

As illustrated in FIG. 8, the positioning part F1 and second positioning part F2 are located at positions between the first scanning lens 60YM and second scanning lens 60CK with respect to the second direction. The positioning part F1 and second positioning part F2 are disposed on a straight line L1 orthogonal to the first and second directions that passes through the rotational axis X1 of the polygon mirror 51. The second positioning part F2 is positioned opposite the positioning part F1 with respect to the rotational axis X1 of the polygon mirror 51. In other words, the second positioning part F2 is positioned opposite the positioning part F1 in the third direction such that the rotational axis X1 for the polygon mirror 51 is interposed between the positioning part F1 and second positioning part F2.

Figure 9:
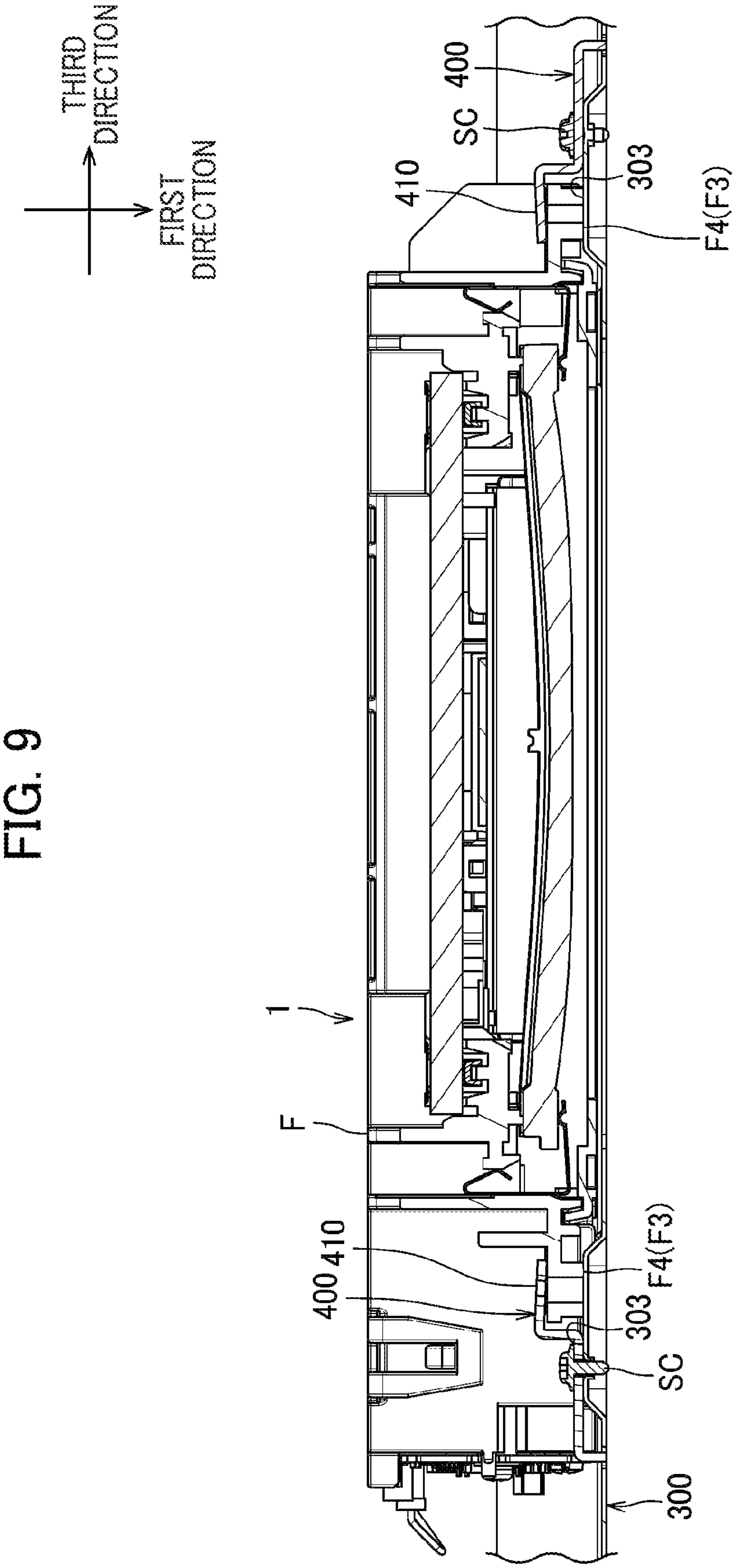
FIG. 9 is a cross-sectional view illustrating a state where the scanning optical device is attached to the support plate by attaching members.

As illustrated in FIG. 9, the scanning optical device 1 is attached to the support plate 300 by four attaching members 400. Each attaching member 400 has a leaf spring portion 410. The frame F has four portions F4 each having one of the four seating surfaces F3, and each portion F4 is interposed between the leaf spring portion 410 of the corresponding attaching member 400 and the corresponding support surface 303 of the support plate 300. The attaching members 400 are fixed to the respective support surfaces 303 with screws SC, at which time the elastic force of the leaf spring portions 410 presses the seating surfaces F3 against the support surfaces 303.

Figure 10:
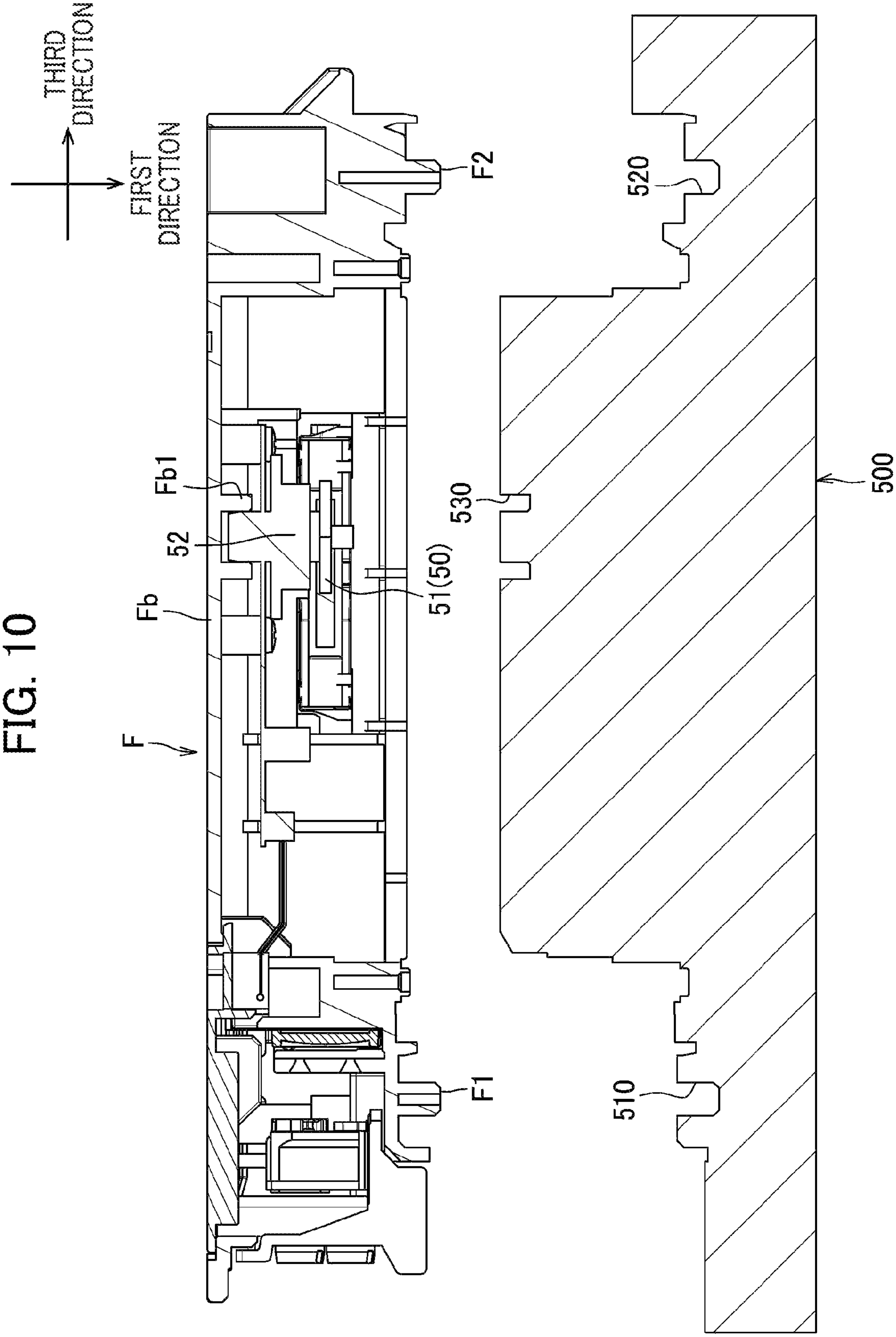
FIG. 10 is a cross-sectional view illustrating a mold for forming a surface of the frame at the one side in the first direction.

As illustrated in FIG. 10, a cylindrical protrusion Fb1 is provided on the base wall Fb. The protrusion Fb1 protrudes toward the one side in the first direction from the base wall Fb. A shaft part of the motor 52 of the deflector 50 is mounted in the cylindrical protrusion Fb1.

The surface of the frame F at the one side in the first direction is formed by injection molding using a mold 500. As illustrated in FIG. 10, the mold 500 has a first molding surface 510 for forming the positioning part F1, a second molding surface 520 for forming the second positioning part F2, and a third molding surface 530 for forming the protrusion Fb1. Hence, the positioning part F1, second positioning part F2, and protrusion Fb1 of the frame F are molded by the same mold 500.

The embodiment described above can obtain the following technical advantages.

The positioning parts F1 and F2 are provided respectively on the crossing walls F12 and F22 that are strengthened by the respective first walls F11 and F21 and second walls F13 and F23, as illustrated in FIG. 7. Accordingly, the scanning optical device 1 can be precisely positioned relative to the support plate 300.

Since the positioning parts F1 and F2 protrude from the crossing walls F12 and F22, respectively, the positioning parts F1 and F2 can engage with the corresponding holes 301 and 302 formed in the support plate 300 for positioning the frame F.

Since the second positioning part F2 is positioned opposite the positioning part F1 with respect to the rotational axis X1, as illustrated in FIG. 8, the positioning part F1 and second positioning part F2 can define the orientation of the scanning optical device 1 about the rotational axis X1.

Since the rib F30 is connected to the first wall F21 and second wall F23, the rib F30 can reinforce the first wall F21 and second wall F23.

Since the positioning parts F1 and F2 are positioned between the first scanning lens 60YM and second scanning lens 60CK with respect to the second direction, the reference point of thermal expansion of the frame F can be located between the first scanning lens 60YM and the second scanning lens 60CK.

As illustrated in FIG. 7A, the coupling lenses 20 are positioned between the first wall F11 and second wall F13 in the third direction (in the direction that the first wall F11 and second wall F13 are aligned). With this structure, the coupling lenses 20 can be arranged in a portion of the frame F that is strengthened by the first wall F11 and second wall F13.

As illustrated in FIG. 9, the frame F has the seating surfaces F3 that contact the support plate 300. Accordingly, the position of the scanning optical device 1 relative to the support plate 300 in the first direction can be determined by this contact between the seating surfaces F3 and the support plate 300.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

For example, in the above embodiment, the light sources Ls each having the semiconductor laser 10 and coupling lens 20 is employed as an example of a light source of the disclosure. However, the light source of the disclosure is not limited to any specific configuration, provided that the light source can emit a light beam. Additionally, the light source of the disclosure may include a semiconductor laser that possesses a plurality of light-emitting points. In this case, the light source may be configured with a single coupling lens for converting light emitted from the plurality of light-emitting points of a single semiconductor laser into a plurality of light beams.

In the above embodiment, the scanning optical device 1 provided with a plurality of light sources Ls for emitting a plurality of light beams is employed as an example of the scanning optical device of the disclosure. However, the scanning optical device of the disclosure may be configured of a single light source that emits only one light beam, for example.

In the above embodiment, the positioning part F1 and second positioning part F2 are for realizing positioning of the frame F relative to the support plate 300. However, positioning parts of the disclosure need not be bosses, but may be holes, for example. In this case, a support plate of the disclosure may be provided with bosses that are inserted into the holes.

The elements described in the above embodiment and variations may be implemented in any combination.

What is claimed is:

1. A scanning optical device mounted on a main body of an image-forming apparatus, the scanning optical device comprising:

a light source configured to emit a light beam;

a deflector comprising a polygon mirror configured to deflect the light beam from the light source, the polygon mirror being rotatable about an axis extending in a first direction;

a scanning optical system configured to form an image on an image plane using the light beam from the polygon mirror; and a frame to which the light source, the deflector and the scanning optical system are fixed, the frame comprising:

a base wall on which the deflector is mounted;

a first wall extending from the base wall toward one side in the first direction;

a crossing wall extending in a direction crossing the first direction from the first wall;

a second wall extending toward another side in the first direction from the crossing wall; and a boss provided on the crossing wall for positioning of the scanning optical device relative to the main body, the boss protruding from the crossing wall.

2. The scanning optical device according to claim 1, wherein the boss protrudes toward the one side in the first direction.

3. The scanning optical device according to claim 1, wherein the scanning optical device is mounted on a support plate that constitutes the main body of the image-forming apparatus, and wherein the boss is inserted in an elongated hole formed on the support plate.

4. The scanning optical device according to claim 1, further comprising a cover configured to cover the deflector and the scanning optical system from the one side in the first direction, wherein the cover has a hole through which the boss passes.

5. The scanning optical device according to claim 1, wherein the crossing wall is orthogonal to the first direction.

6. The scanning optical device according to claim 1, wherein the frame further comprises a second boss for positioning of the scanning optical device relative to the main body, the second boss being positioned opposite the boss with respect to the axis of the polygon mirror.

7. The scanning optical device according to claim 1, wherein the frame further comprises a rib connected to the first wall and the second wall.

8. A scanning optical device mounted on a main body of an image-forming apparatus, the scanning optical device comprising:

a light source configured to emit a light beam;

a deflector comprising a polygon mirror configured to deflect the light beam from the light source, the polygon mirror being rotatable about an axis extending in a first direction;

a scanning optical system configured to form an image on an image plane using the light beam from the polygon mirror; and a frame to which the light source, the deflector and the scanning optical system are fixed, the frame comprising:

a base wall on which the deflector is mounted;

a first wall extending from the base wall toward one side in the first direction;

a crossing wall extending in a direction crossing the first direction from the first wall;

a second wall extending toward another side in the first direction from the crossing wall; and a positioning part provided on the crossing wall for positioning of the scanning optical device relative to the main body, wherein the scanning optical system comprises:

a first scanning lens through which the light beam deflected by the polygon mirror passes, the first scanning lens being positioned on one side of the polygon mirror in a second direction orthogonal to the first direction; and a second scanning lens through which the light beam deflected by the polygon mirror passes, the second scanning lens being positioned on another side of the polygon mirror in the second direction, and wherein the positioning part is positioned between the first scanning lens and the second scanning lens in the second direction.

9. The scanning optical device according to claim 8, wherein the positioning part is positioned on a straight line, the straight line being orthogonal to both the first direction and the second direction and passing through the axis of the polygon mirror.

10. The scanning optical device according to claim 1, wherein the light source comprises:

a semiconductor laser configured to emit light; and a coupling lens configured to convert the light from the semiconductor laser into the light beam, and wherein the coupling lens is positioned between the first wall and the second wall in a direction orthogonal to the first direction.

11. The scanning optical device according to claim 1, wherein the frame has a seating surface that contacts the main body in the first direction, the seating surface being spaced apart from the boss in a second direction orthogonal to the first direction.

12. The scanning optical device according to claim 8, wherein the crossing wall is orthogonal to the first direction.

13. The scanning optical device according to claim 8, wherein the frame further comprises a second positioning part for positioning of the scanning optical device relative to the main body, the second positioning part being positioned opposite the positioning part with respect to the axis of the polygon mirror.

14. The scanning optical device according to claim 8, wherein the light source comprises:

a semiconductor laser configured to emit light; and a coupling lens configured to convert the light from the semiconductor laser into the light beam, and wherein the coupling lens is positioned between the first wall and the second wall in a direction orthogonal to the first direction.

15. The scanning optical device according to claim 8, wherein the frame has a seating surface that contacts the main body in the first direction, the seating surface being spaced apart from the positioning part in the second direction.

* * * * *